United States Patent
Okamoto et al.

(10) Patent No.: US 12,049,546 B2
(45) Date of Patent: Jul. 30, 2024

(54) HYDRAULIC TRANSFER BASE FILM, AND HYDRAULIC TRANSFER PRINTING FILM

(71) Applicant: KURARAY CO., LTD., Okayama (JP)

(72) Inventors: Minoru Okamoto, Okayama (JP); Sayaka Shimizu, Okayama (JP); Osamu Kazeto, Okayama (JP)

(73) Assignee: KURARAY CO., LTD., Okayama (JP)

( * ) Notice: Subject to any disclaimer, the term of this patent is extended or adjusted under 35 U.S.C. 154(b) by 386 days.

(21) Appl. No.: 17/360,098

(22) Filed: Jun. 28, 2021

(65) Prior Publication Data
US 2021/0324164 A1    Oct. 21, 2021

Related U.S. Application Data

(63) Continuation of application No. PCT/JP2019/051494, filed on Dec. 27, 2019.

(30) Foreign Application Priority Data

Dec. 28, 2018 (JP) ................. 2018-248286

(51) Int. Cl.
| | | |
|---|---|---|
| C08J 5/18 | (2006.01) | |
| B41M 5/50 | (2006.01) | |
| B65D 65/42 | (2006.01) | |
| B65D 65/46 | (2006.01) | |
| C08K 5/053 | (2006.01) | |

(52) U.S. Cl.
CPC ............. *C08J 5/18* (2013.01); *B41M 5/502* (2013.01); *B65D 65/42* (2013.01); *B65D 65/46* (2013.01); *C08J 2329/04* (2013.01); *C08J 2331/04* (2013.01); *C08K 5/053* (2013.01)

(58) Field of Classification Search
None
See application file for complete search history.

(56) References Cited

U.S. PATENT DOCUMENTS

| | | |
|---|---|---|
| 7,674,518 B2 | 3/2010 | Hayakawa et al. |
| 8,927,061 B2 | 1/2015 | Hikasa et al. |
| 9,908,957 B2 | 3/2018 | Mori et al. |
| 2003/0114332 A1 | 6/2003 | Ramcharan et al. |
| 2007/0087171 A1 | 4/2007 | Hikasa et al. |
| 2011/0236608 A1 | 9/2011 | Vavassori Bisutti |
| 2016/0102279 A1 | 4/2016 | Labeque et al. |
| 2016/0194465 A1 | 7/2016 | Takafuji et al. |
| 2016/0340456 A1 | 11/2016 | Mori et al. |
| 2017/0233539 A1 | 8/2017 | Friedrich et al. |
| 2017/0259975 A1 | 9/2017 | Yonezawa et al. |
| 2017/0298155 A1 | 10/2017 | Takafuji et al. |
| 2017/0355938 A1 | 12/2017 | Lee et al. |
| 2018/0245028 A1 | 8/2018 | Ookubo et al. |
| 2018/0251613 A1 | 9/2018 | Hiura et al. |
| 2020/0063076 A1 | 2/2020 | Hiura |
| 2021/0171882 A1 | 6/2021 | Tanikawa et al. |

FOREIGN PATENT DOCUMENTS

| | | |
|---|---|---|
| CA | 3001549 A1 | 10/2017 |
| CN | 1871138 A | 11/2006 |
| CN | 107746467 A | 3/2018 |
| EP | 0347219 A1 | 12/1989 |
| EP | 3348605 A1 | 7/2018 |
| EP | 3348608 A1 | 7/2018 |
| EP | 3677405 A1 | 7/2020 |
| EP | 3904035 A1 | 11/2021 |
| EP | 3904231 A1 | 11/2021 |
| EP | 3904232 A1 | 11/2021 |
| JP | H06-138321 A | 5/1994 |
| JP | H10-296820 A | 11/1998 |
| JP | 2000-006595 A | 1/2000 |
| JP | 2000296529 A | 10/2000 |
| JP | 2001329130 A | 11/2001 |
| JP | 2002-020507 A | 1/2002 |
| JP | 2002-030162 A | 1/2002 |
| JP | 2002-241797 A | 8/2002 |
| JP | 2002-347112 A | 12/2002 |
| JP | 2005-060636 A | 3/2005 |
| JP | 2005-194295 A | 7/2005 |
| JP | 2005179390 A | 7/2005 |
| JP | 2010-155453 A | 7/2010 |
| JP | 2014-016649 A | 1/2014 |
| JP | 2016060746 A | 4/2016 |
| JP | 2016-150769 A | 8/2016 |
| JP | 2016-222834 A | 12/2016 |
| JP | 2017-078166 A | 4/2017 |
| JP | 2017-095679 A | 6/2017 |
| JP | 2017-110213 A | 6/2017 |
| JP | 2017-114931 A | 6/2017 |

(Continued)

OTHER PUBLICATIONS

Takafuji et al., WO 2015020046, Mar. 2, 2015 (machine translation) (Year: 2015).*

Office Action issued in Japanese Patent Application No. 2020-562512 corresponding to U.S. Appl. No. 17/360,018 dated Jun. 20, 2023.

(Continued)

*Primary Examiner* — Cheng Yuan Huang
(74) *Attorney, Agent, or Firm* — Morgan, Lewis & Bockius LLP (57) ABSTRACT

The present invention provides a monolayer base film for hydraulic transfer printing that is excellent in water solubility and allows high resolution transfer printing without rupture even in high speed printing and a film for hydraulic transfer printing using the same. The present invention is a base film for hydraulic transfer printing comprising a polyvinyl alcohol resin, the base film forming a printing layer to be transferred to an article by hydraulic transfer printing. In this base film for hydraulic transfer printing, the base film for hydraulic transfer printing has an amount (A1) of crystalline component of 60% or less and an amount (A2) of constrained amorphous component from 10% to 50%, the amounts being obtained from a spin-spin relaxation curve by $^1$H pulse NMR measurement of the base film in deuterated methanol, and a moisture content from 1 to 5 mass %.

19 Claims, 1 Drawing Sheet

(56) References Cited

FOREIGN PATENT DOCUMENTS

| | | | |
|---|---|---|---|
| JP | 2017-115128 A | 6/2017 | |
| JP | 2017-119434 A | 7/2017 | |
| JP | 2017-119853 A | 7/2017 | |
| JP | 2017-217866 A | 12/2017 | |
| JP | 2019-044021 A | 3/2019 | |
| WO | 2009/075202 A1 | 6/2009 | |
| WO | WO2010/082522 A1 | 7/2012 | |
| WO | 2013/146147 A1 | 10/2013 | |
| WO | 2014/050696 A1 | 4/2014 | |
| WO | WO2015/118978 A1 | 8/2015 | |
| WO | WO2016/084836 A1 | 6/2016 | |
| WO | WO2016/190235 A1 | 12/2016 | |
| WO | 2017/043508 A1 | 3/2017 | |
| WO | 2017043514 A1 | 3/2017 | |
| WO | WO2015/020046 A1 | 3/2017 | |
| WO | WO2017/043505 A1 | 3/2017 | |
| WO | WO2017/043509 A1 | 3/2017 | |
| WO | WO2018/230583 A1 | 12/2018 | |
| WO | 2019/044751 A1 | 3/2019 | |
| WO | WO2019/198683 A1 | 10/2019 | |

OTHER PUBLICATIONS

Office Action issued in Chinese Patent Application No. 201980086856.6 corresponding to U.S. Appl. No. 17/359,960 dated Jun. 21, 2023.
Office Action issued in Chinese Patent Application No. 201980086787.9 corresponding to U.S. Appl. No. 17/360,004 dated Apr. 12, 2023.
Office Action issued in Chinese Patent Application No. 201980086844.3 corresponding to U.S. Appl. No. 17/360,055 dated Jun. 8, 2023.
Office Action issued in Japanese Patent Application No. 2020-562508 (corresponding to U.S. Appl. No. 17/359,952) dated Oct. 4, 2022.
Office Action issued in Japanese Patent Application No. 2020-562509 (corresponding to U.S. Appl. No. 17/359,960) dated Oct. 4, 2022.
Office Action issued in Japanese Patent Application No. 2020-562516 (corresponding to U.S. Appl. No. 17/360,098) dated Oct. 4, 2022.
Office Action issued in Japanese Patent Application No. 2020-562510 (corresponding to U.S. Appl. No. 17/359,991) dated Oct. 25, 2022.
Office Action issued in Japanese Patent Application No. 2020-562513 (corresponding to U.S. Appl. No. 17/360,040) dated Nov. 22, 2022.
Office Action issued in Japanese Patent Application No. 2020-562515 (corresponding to U.S. Appl. No. 17/360,076) dated Sep. 13, 2022.
Office Action issued in related Chinese Patent Application No. 201980086843.9 dated Jul. 25, 2022.
Office Action issued in related Chinese Patent Application No. 201980086787.9 dated Aug. 2, 2022.
Notice of Reasons for Refusal issued in Japanese Patent Application No. 2020-562510 corresponding to U.S. Appl. No. 17/359,991 dated Apr. 10, 2023.
Decision of Refusal issued in Japanese Patent Application No. 2020-562511 corresponding to U.S. Appl. No. 17/360,004 dated Mar. 29, 2023.
Office Action issued in Chinese Patent Application No. 201980086859.X corresponding to U.S. Appl. No. 17/359,991 dated Mar. 3, 2023.
Office Action issued in Chinese Patent Application No. 201980086844.3 corresponding to U.S. Appl. No. 17/360,055 dated Mar. 2, 2023.
Office Action issued in Chinese Patent Application No. 201980086857.0 corresponding to U.S. Appl. No. 17/360,076 dated Feb. 18, 2023.
Office Action issued in Chinese Patent Application No. 201980086834.X corresponding to U.S. Appl. No. 17/360,098 dated Feb. 23, 2023.
Office Action issued in Taiwanese Patent Application No. 108148017 corresponding to U.S. Appl. No. 17/360,098 dated Jan. 19, 2023.
Office Action issued in Japanese Patent Application No. 2020-562511 (corresponding to U.S. Appl. No. 17/360,004) dated Jan. 16, 2023.
Office Action issued in Japanese Patent Application No. 2020-562512 (corresponding to U.S. Appl. No. 17/360,018) dated Jan. 16, 2023.
Office Action issued in Chinese Patent Application No. 201980086862.1 (corresponding to U.S. Appl. No. 17/359,952) dated Dec. 5, 2022.
Office Action issued in Chinese Patent Application No. 201980086856.6 (corresponding to U.S. Appl. No. 17/359,960) dated Dec. 27, 2022.
Office Action issued in Chinese Patent Application No. 201980086861.7 (corresponding to U.S. Appl. No. 17/360,040) dated Dec. 7, 2022.
Office Action issued in Chinese Patent Application No. 201980086834.X (corresponding to U.S. Appl. No. 17/360,098) dated Dec. 8, 2022.
Extended European Search Report issued in related European Patent Application No. 19901491.1 dated Aug. 18, 2022.
Extended European Search Report issued in related European Patent Application No. 19905634.2 dated Aug. 30, 2022.
Shiga et al., "Pulsed NMR Study of the Structure of Poly(vinyl alcohol)-Poly(sodium acrylate) Composite Hydrogel," Journal of Polymer Science: Part B: Polymer Physics, 32: 85-90 (1994).
Takigawa et al., "Structure and mechanical properties of poly(vinyl alcohol) gels swollen by various solvents," Polymer, 33 (11): 2334-2339 (1992).
Extended European Search Report issued in related European Patent Application No. 19903285.5 dated Aug. 24, 2022.
Extended European Search Report issued in related European Patent Application No. 19905828.0 dated Sep. 14, 2022.
Extended European Search Report issued in related European Patent Application No. 19905635.9 dated Sep. 14, 2022.
Extended European Search Report issued in related European Patent Application No. 19902016.5 dated Aug. 18, 2022.
Extended European Search Report issued in related European Patent Application No. 19901493.7 dated Aug. 24, 2022.
Jang et al., "Plasticizer effect on the melting and crystallization behavior of polyvinyl alcohol," Polymer, 44: 8139-8146 (2003).
Peppas, "Infrared spectroscopy of semicrystalline poly(vinyl alcohol) networks," Die Makromolekulare Chemie, 178 (2): 595-601 (1977) (English abstract only).
Extended European Search Report issued in related European Patent Application No. 19903286.3 dated Aug. 24, 2022.
Extended European Search Report issued in related European Patent Application No. 19905031.1 dated Sep. 1, 2022.
International Search Report issued in related International Patent Application No. PCT/JP2019/051494 dated Mar. 24, 2020.
Office Action issued in the U.S. Appl. No. 17/360,004, dated Oct. 11, 2023.
Office Action issued in the U.S. Appl. No. 17/360,018, dated Oct. 11, 2023.
Office Action issued in the JP Patent Application No. 2020-562512, dated Nov. 28, 2023 (corresponding to U.S. Appl. No. 17/360,018).
Written opposition on JP Application No. 2020-562508, Patent No. 7240420, dispatched on Oct. 18, 2023 (received Oct. 20, 2023)—concise explanation in English attached (corresponding to U.S. Appl. No. 17/359,952).
Notice of reasons for revocation on JP Application No. 2020-562508, Patent No. 7240420, dispatched on Nov. 15, 2023 (received Nov. 17, 2023)—concise explanation in English attached (corresponding to U.S. Appl. No. 17/359,952).
Trial and Appeal Decision No. 2020-35529, issued on JP Patent No. 2543748.
Second Office Action issued in Chinese Patent Application No. 201980086859.X dated Jul. 3, 2023, corresponding to U.S. Appl. No. 17/359,991.
Office Action issued in U.S. Appl. No. 17/360,040 dated Jul. 7, 2023.
Office Action issued in the U.S. Appl. No. 17/360,076, dated Feb. 12, 2024.
Office Action issued in the U.S. Appl. No. 17/359,960, dated Feb. 20, 2024.
Office Action issued in the U.S. Appl. No. 17/359,991, dated Feb. 28, 2024.

(56) References Cited

OTHER PUBLICATIONS

Office Action issued in the U.S. Appl. No. 17/360,018, dated Mar. 26, 2024.
Office Action issued in the U.S. Appl. No. 17/360,004, dated Mar. 26, 2024.

\* cited by examiner

HYDRAULIC TRANSFER BASE FILM, AND HYDRAULIC TRANSFER PRINTING FILM

TECHNICAL FIELD

The present invention relates to a base film for hydraulic transfer printing suitable for imparting high resolution design to a shaped object with a three-dimensional uneven surface or a curved surface, and to a printing film for hydraulic transfer printing using the same.

BACKGROUND ART

In the related art, water-soluble films are used in a wide range of fields, including packaging of various chemicals, such as liquid detergents, pesticides, and germicides, and seed tapes encapsulating seeds, taking advantage of excellent solubility in water.

For printing on a surface of a shaped object with a non-planar uneven shape, printing films for hydraulic transfer printing having a printing layer formed thereon are generally used. In this case, a method is employed in which a printing film for hydraulic transfer printing is floated on a water surface with the printing surface upward to be sufficiently swollen, followed by pressing a shaped object as an article subjected to transfer printing, directed from above into the water, on a printing layer, thereby transfer printing the printing layer on a surface of the article. In such a printing film for hydraulic transfer printing in the past, a film using a water-soluble or water-swellable resin, such as a polyvinyl alcohol resin (hereinafter, may be referred to as "PVA"), as a raw material is used as a base film for hydraulic transfer printing (hereinafter, a base film for hydraulic transfer printing may be referred to as a "base film"). The base film for hydraulic transfer printing is used as a base material for a printing layer, and the base film having a printing layer laminated thereon becomes a printing film for hydraulic transfer printing.

The base film for hydraulic transfer printing using PVA as a raw material is likely to extend during formation of a printing layer due to the influence of the humidity, temperature, and film tension. For example, for continuous printing, such as gravure printing, longitudinal extension of the base film causes deformation of the printing pattern. Particularly in multicolor printing, the nonuniform extension of the base film is likely to cause a shift between a printing pattern printed earlier and a printing pattern printed later in another color by failing to overlap the printing patterns well. As a result, the case of using such a printing film for hydraulic transfer printing used to cause a problem of difficulty in high resolution transfer printing on a shaped object.

To cope with this problem, a method is considered in which heat treatment is performed during base film formation to increase the degree of crystallization of the base film and thus to harden the base film. However, in that case, there are concerns about the problem of causing difficulty in washing and removing the PVA from the shaped object after hydraulic transfer printing, causing creases in the printing layer due to worsening of conformability of the base film to the shaped object during transfer printing, or the like.

To further cope with this problem, proposals are made including: a method in which a pre-transfer film is prepared by forming a printing layer, a release layer, and the like on a plastic film or paper, and the pre-transfer film and a base film are overlaid and heated and pressurized for pre-transfer, and then the pre-transfer film is released to produce a printing film for hydraulic transfer printing (e.g., refer to PTL 1); a base film for hydraulic transfer printing including a multilayer material of a water-soluble PVA layer and any one of layers I through III below (e.g., refer to PTL 2); and the like. It should be noted that the layer I is a layer containing water-soluble PVA satisfying specific relationship with the above water-soluble PVA layer, the layer II is a layer containing water-soluble PVA and inorganic particles having an average particle diameter from 2 to 20 µm, and the layer III is a layer containing at least one water-soluble resin selected from the group consisting of polysaccharides and acrylic resins.

These methods certainly allow high resolution transfer printing even in multicolor printing. However, these cases used to have a problem of an increase in costs compared with the case of direct printing on a monolayer base film.

Meanwhile, a base film is proposed that has specific degrees of polymerization and saponification and has a shrinkage in width after applying a certain tension at 50° C. for one minute satisfying a specific value (e.g., refer to PTL 3). Use of this method allows high resolution transfer printing on a monolayer base film.

However, in recent years, even by the method described in PTL 3, high speed printing on a monolayer base film for productivity improvement sometimes causes difficulty in high resolution transfer printing. High speed printing also causes rupture of the base film when a monolayer base film wound in a roll is rapidly unwound.

There is a technique called pulse NMR (nuclear magnetic resonance) used as a method of obtaining abundance ratios of respective moving components (crystalline component, constrained amorphous component, and amorphous component) in an optical PVA film (e.g., refer to PTL 4). However, the correlation between the abundance ratios of the respective moving components obtained by pulse NMR and various kinds of performance expected from such a base film for hydraulic transfer printing has not been investigated yet.

CITATION LIST

Patent Literature

PTL 1: JP 2000-6595 A
PTL 2: WO 2010/082522
PTL 3: JP 2005-60636 A
PTL 4: WO 2015/020046

SUMMARY OF INVENTION

Technical Problem

The present invention provides a monolayer base film for hydraulic transfer printing that is excellent in water solubility and allows high resolution transfer printing without rupture even in high speed printing and a film for hydraulic transfer printing using the same.

Solution to Problem

The present inventors have found that the above problems are solved by keeping the amount of crystalline component, the amount of constrained amorphous component, and the moisture content in the base film containing PVA in specific ranges to complete the present invention.

A first aspect of the present invention relates to a base film for hydraulic transfer printing including a polyvinyl alcohol resin, the base film forming a printing layer to be transferred to an article by hydraulic transfer printing.

The base film for hydraulic transfer printing has an amount (A1) of crystalline component of 60% or less and an amount (A2) of constrained amorphous component from 10% to 50%, the amounts being obtained from a spin-spin relaxation curve by $^1$H pulse NMR measurement of the base film in deuterated methanol, and a moisture content from 1 to 5 mass %.

In the base film for hydraulic transfer printing according to an aspect of the present invention, a ratio (A1/A2) of the amount (A1) of crystalline component to the amount (A2) of constrained amorphous component may be from 0.1 to 5.

In the base film for hydraulic transfer printing according to the above aspect of the present invention, a ratio (A2/A3) of the amount (A2) of constrained amorphous component to an amount (A3) of amorphous component obtained from the spin-spin relaxation curve may be 1.5 or less.

In the base film for hydraulic transfer printing according to the above aspect of the present invention, complete dissolution time of the base film for hydraulic transfer printing immersed in deionized water at 10° C. may be 90 seconds or less.

In the base film for hydraulic transfer printing according to the above aspect of the present invention, from 0.5 to 15 parts by mass of a plasticizer and/or from 0.1 to 15 parts by mass of starch may be blended based on 100 parts by mass of the polyvinyl alcohol resin (PVA).

In the base film for hydraulic transfer printing according to the above aspect of the present invention, the base film for hydraulic transfer printing may have a thickness from 15 to 50 μm.

Still another aspect of the present invention relates to a printing film for hydraulic transfer printing, including: the base film for hydraulic transfer printing according to the above aspect; and the printing layer formed on a surface of the base film for hydraulic transfer printing.

In the printing film for hydraulic transfer printing according to the above aspect of the present invention, the printing layer may be a laminated printing layer having laminated printing patterns different in at least one of hue, saturation, and brightness.

Advantageous Effects of Invention

According to the present invention, it is possible to provide a base film for hydraulic transfer printing using PVA as a raw material and allowing high resolution transfer printing without rupture even in high speed printing on the monolayer base film for hydraulic transfer printing, and a printing film for hydraulic transfer printing.

DESCRIPTION OF EMBODIMENTS

The present invention is specifically described below.

A base film for hydraulic transfer printing of the present invention contains a polyvinyl alcohol resin (PVA). The base film has an amount (A1) of crystalline component of 60% or less and an amount (A2) of constrained amorphous component from 10% to 50%, the amounts being obtained from a spin-spin relaxation curve by $^1$H pulse NMR measurement of the base film for hydraulic transfer printing in deuterated methanol. The base film for hydraulic transfer printing has a moisture content from 1 to 5 mass %.

It should be noted that, in the description below, the PVA containing base film for hydraulic transfer printing of the present invention may be referred to as a "PVA film".

Pulse NMR

The pulse NMR is, different from versatile NMR used for structure determination of organic compounds and the like, an analysis method capable of measuring relaxation time of the $^1$H nucleus related to the molecular mobility in the system. Using the high quantitative performance of the pulse NMR, it is possible to obtain abundance ratios of respective moving components in the system.

In a pulse NMR measurement apparatus, a static magnetic field is generated by an electromagnet in the apparatus. In the static magnetic field, the orientation of the nuclear spin of the hydrogen nucleus is oriented in the direction along the static magnetic field. Addition of a pulsed magnetic field in this state causes the nuclear spin of the hydrogen nucleus to be in a state tilted 90° (excited state) from the direction along the static magnetic field. Then, the orientation of the nuclear spin thus excited macroscopically returns to the original direction along the static magnetic field.

Process of the orientation of the nuclear spin returning from the excited state to the original state is referred to as "T2 relaxation" and the time taken for the process is referred to as relaxation time (tau). In the case of single component relaxation, magnetization intensity (y) at time (t) is represented by a formula below using intensity (a) in the excited state, relaxation time (tau), and constants (y0, W).

$$y = y0 + a \times \exp(-1/W \times (t/\text{tau})^w) \quad \text{(Math 1)}$$

It should be noted that W is called as a Weibull modulus, and in the case of W=1, the formula is exp type, and in the case of W=2, the formula is gauss type. In the case of a general, polymer W ranges 1≤W≤2.

In the case of T2 relaxation, the hydrogen nucleus attenuates from the excited state to the original state while exchanging energy with other hydrogen nuclei. Accordingly, in the case that a sample has high molecular mobility, interaction between neighboring protons is weak and thus energy is less likely to attenuates in the entire system, causing longer relaxation time. In contrast, in the case that a sample has low molecular mobility, the relaxation time becomes short.

Figure 1:
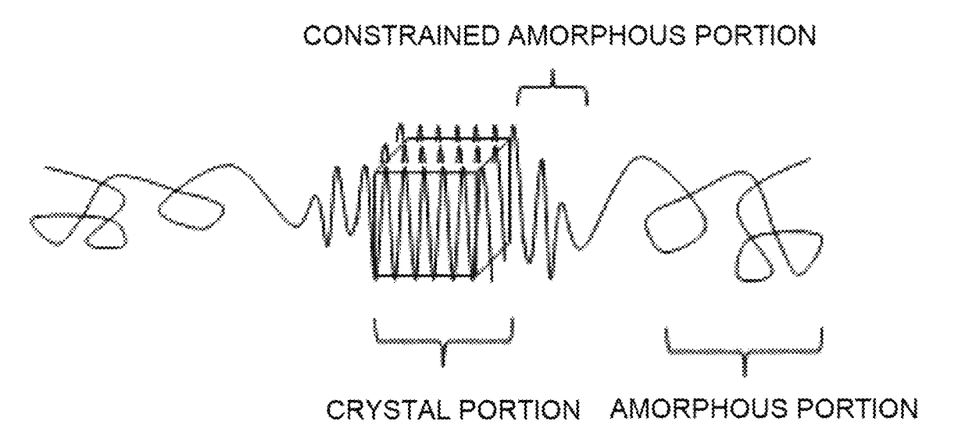
FIG. 1 is a diagram schematically illustrating the crystal structure in a film.

Thus, in a crystalline polymer, the crystalline component has a short relaxation time and the amorphous component has a long relaxation time. In addition, a constrained amorphous component (refer to FIG. 1), which is a boundary between the crystalline component and the amorphous component, has an intermediate relaxation time between them.

While usual X-ray measurement and the like can only measure the amount of crystalline component and the amount of amorphous component, pulse NMR can measure the amount of constrained amorphous component in addition to the amount of crystalline component and the amount of amorphous component. Particularly in pulse NMR, the abundance ratios of the respective moving components are determined based on the mobility of the crystalline polymer not available from X-ray measurement. The abundance ratios are values more accurately reflecting various kinds of performance expected from such a PVA film. Use of pulse NMR thus allows very appropriate evaluation of the PVA film properties.

It should be noted that the crystalline component, the constrained amorphous component, and the amorphous component are mixed in an actual crystalline polymer. A relaxation curve obtained by pulse NMR measurement of the PVA film containing the crystalline polymer is thus observed as a sum of the relaxation component derived from the crystalline component with a short relaxation time, the relaxation component derived from the amorphous component with a long relaxation time, and the relaxation component derived from the constrained amorphous component with a relaxation time approximately intermediate between them.

In the present invention, a relaxation curve obtained by the method of linear least squares is fit to a formula below. When the crystalline component has a relaxation time tau1, the constrained amorphous component has a relaxation time tau2, and the amorphous component has a relaxation time tau3, the magnetization intensity (y) of the entire sample at time (t) is represented by the formula below using the constant y0 and a1, a2, and a3 in the excited state.

$$y = y0 + a1 \times \exp(-1/W1 \times (t/tau1)^{w1}) + a2 \times \exp(-1/W2 \times (t/tau2)^{w2}) + a3 \times \exp(-1/W3 \times (t/tau3)^{w3}) \quad \text{(Math 2)}$$

As a result of an intensive examination in this process, a formula below where the crystalline component and the constrained amorphous component are respectively attributed to gauss type relaxation (W1, W2=2) and the amorphous component is attributed to exp type relaxation (W3=1), and the relaxation times are fixed to tau1=0.01 ms, tau2=0.05 ms, and tau3=0.50 ms is used as a formula (fitting function formula) stably and reproducibly fittable to PVA films produced under respective film formation conditions.

$$y = y0 + a1 \times \exp(-0.5 \times (t/0.01)^2) + a2 \times \exp(-0.5 \times (t/0.05)^2) + a3 \times \exp(-t/0.50) \quad \text{(Math 3)}$$

In the present invention, a1, a2, a3, and y0 drawn from the above formula are obtained to define ratios (%) of the respective components based on the total (a1+a2+a3) of a1, a2, and a3 as an amount (A1) of crystalline component, an amount (A2) of constrained amorphous component, and an amount (A3) of amorphous component. For example, the value of the amount (A2) of constrained amorphous component is represented by a2/(a1+a2+a3)×100.

The amount (A1) of crystalline component is 60% or less. More than 60% of the amount (A1) of crystalline component causes insufficient water solubility of the PVA film. The upper limit of the amount (A1) of crystalline component may be 60% or less, preferably 55% or less, and even more preferably 50% or less. Meanwhile, the lower limit of the amount (A1) of crystalline component is preferably, but not particularly limited to, 10% or more and more preferably 20% or more.

The amount (A2) of constrained amorphous component is from 10% to 50%. The lower limit of the amount (A2) of constrained amorphous component is preferably 15% or more and more preferably 20% or more. Meanwhile, the upper limit of the amount (A2) of constrained amorphous component is preferably 45% or less and more preferably 40% or less.

The amount (A1) of crystalline component and the amount (A2) of constrained amorphous component in the above ranges allow suppression of nonuniform extension of the PVA film during printing while maintaining good water solubility of the PVA film, and as a result, allow high resolution transfer printing.

The lower limit of the amount (A3) of amorphous component is preferably, but not particularly limited to, 10% or more, more preferably 20% or more, and even more preferably 30% or more. Meanwhile, the upper limit of the amount (A3) of amorphous component is preferably, but not particularly limited to, 70% or less, more preferably 60% or less, and even more preferably 50% or less. The amount (A3) of amorphous component in the above range allows improvement of the water solubility of the PVA film while suppressing nonuniform extension of the PVA film during printing, and as a result, allows high resolution transfer printing.

A ratio (A1/A2) of the amount (A1) of crystalline component to the amount (A2) of constrained amorphous component is preferably, but not particularly limited to, from 0.1 to 5. The upper limit of (A1/A2) is more preferably 2 or less. Meanwhile, the lower limit of (A1/A2) is more preferably, but not particularly limited to, 0.5 or more. (A1/A2) in the above range allows sufficient increases in both the effect of maintaining water solubility of the PVA film and the effect of suppressing nonuniform extension of the PVA film during printing, and as a result, allows high resolution transfer printing.

A ratio (A2/A3) of the amount (A2) of constrained amorphous component to the amount (A3) of amorphous component is preferably, but not particularly limited to, 1.5 or less. The upper limit of (A2/A3) is more preferably 1.3 or less and even more preferably 1.0 or less. Meanwhile, the lower limit of (A2/A3) is more preferably, but not particularly limited to, 0.1 or more. (A2/A3) in the above range allows good balance of the effect of maintaining the water solubility of the PVA film and the effect of suppressing the nonuniform extension of the PVA film during printing, and as a result, allows high resolution transfer printing.

In the present invention, it is important to control the parameters as described above in the above ranges. Examples of the method of controlling the parameters include: a method that adjusts a kind (degree of saponification, amount of modification, mixing ratio of unmodified PVA/modified PVA, etc.) of the polyvinyl alcohol resin; a method that adjusts an amount of a plasticizer to be added; a method that adjusts film production conditions (surface temperature of support, heat treatment conditions, etc.); or a method of adjustment by combining the methods described above.

Polyvinyl Alcohol Resin

The PVA film of the present invention contains a polyvinyl alcohol resin (PVA).

As the PVA, it is possible to use a polymer produced by saponifying a vinyl ester polymer obtained by polymerizing a vinyl ester monomer.

Examples of the vinyl ester monomer include vinyl formate, vinyl acetate, vinyl propionate, vinyl valerate, vinyl laurate, vinyl stearate, vinyl benzoate, vinyl pivalate, vinyl versatate, and the like. Among those mentioned above, vinyl acetate is preferred as the vinyl ester monomer.

The vinyl ester polymer is preferably, but not particularly limited to, a polymer obtained using only one or more kinds of vinyl ester monomer as the monomer and more preferably a polymer obtained using only one kind of vinyl ester monomer as the monomer. It should be noted that the vinyl ester polymer may be a copolymer of one or more kinds of vinyl ester monomer and another monomer copolymerizable with the one or more kinds of vinyl ester monomer.

Examples of such another monomer include: ethylene; olefins having a carbon number from 3 to 30, such as propylene, 1-butene, and isobutene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide derivatives, such as acrylamide, N-methylacrylamide, N-ethylacrylamide, N,N-dimethylacrylamide, diacetone acrylamide, acrylamidopropanesulfonic acid and salts thereof, acrylamide propyldimethylamine and salts thereof, and N-methylolacrylamide and derivatives thereof; methacrylamide derivatives, such as methacrylamide, N-methylmethacrylamide, N-ethylmethacrylamide, methacrylamidopropanesulfonic acid and salts thereof, methacrylamide propyldimethylamine and salts thereof, and N-methylolmethacrylamide and derivatives thereof; N-vinylamides, such as N-vinylformamide, N-vinylacetamide, and N-vinylpyrrolidone; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; vinyl cyanides, such as acrylonitrile and methacrylonitrile; vinyl halides, such as vinyl chloride, vinylidene chloride, vinyl fluoride, and vinylidene fluoride; allyl compounds, such as allyl acetate and allyl chloride; maleic acid and salts, esters, and acid anhydrides thereof; itaconic acid and salts, esters, and acid anhydrides thereof; vinylsilyl compounds, such as vinyltrimethoxysilane; isopropenyl acetate; and the like.

It should be noted that the vinyl ester polymer may have a structural unit derived from one or more kinds of such another monomer described above.

A higher ratio of the structural unit derived from such another monomer to the vinyl ester polymer tends to cause a smaller amount (A1) of crystalline component and a smaller ratio (A2/A3) of the amount (A2) of constrained amorphous component to the amount (A3) of amorphous component. This tendency is assumed to be because an increase in the structural unit derived from such another monomer causes reduction in the interaction between the molecules of PVA and thus crystallization by heat treatment does not readily proceed. From the perspective of facilitating adjustment of the amount (A1) of crystalline component, the amount (A2) of constrained amorphous component, and the ratio of the amount (A1) of crystalline component to the amount (A2) of constrained amorphous component in desired ranges and increasing both water solubility and mechanical strength of the PVA film, the ratio of the structural unit derived from such another monomer is preferably, but not particularly limited to, 15 mol % or less based on the number of moles of the total structural units constituting the vinyl ester polymer and more preferably 5 mol % or less.

The degree of polymerization of the PVA is preferably, but not particularly limited to, in a range below. That is, the lower limit of the degree of polymerization is preferably 200 or more from the perspective of maintaining sufficient mechanical strength of the PVA film, more preferably 300 or more, and even more preferably 500 or more. Meanwhile, the upper limit of the degree of polymerization is preferably, but not particularly limited to, 8,000 or less from the perspective of increasing productivity of the PVA, productivity of the PVA film, and the like, more preferably 5,000 or less, and even more preferably 3,000 or less.

In this context, the degree of polymerization means an average degree of polymerization measured in accordance with the description of JIS K 6726-1994. That is, the degree of polymerization herein is obtained by the following formula from the limiting viscosity [η] (unit: deciliter/g) measured, after resaponifying and purifying residual acetic acid groups in the PVA, in water at 30° C.

Degree of Polymerization Po=$([\eta] \times 10^4/8.29)^{(1/0.62)}$ (Math 4)

A higher degree of saponification of the PVA tends to cause a larger amount (A1) of crystalline component and to cause a larger ratio (A1/A2) of the amount (A1) of crystalline component to the amount (A2) of constrained amorphous component. This tendency is assumed to be because a higher degree of saponification causes an increase in interaction between the hydroxyl groups in the molecules of the PVA and thus the crystallization by heat treatment readily proceeds. In the present invention, the degree of saponification of the PVA is preferably, but not particularly limited to, from 70 to 97 mol %. Adjustment of the degree of saponification of the PVA in the range from 70 to 97 mol % facilitates adjustment of the amount (A1) of crystalline component, the amount (A2) of constrained amorphous component, and the ratio of the amount (A1) of crystalline component to the amount (A2) of constrained amorphous component in desired ranges and thus facilitates achievement of both the water solubility and the mechanical strength of the PVA film. The lower limit of the degree of saponification is more preferably, but not particularly limited to, 75 mol % or more and even more preferably 80 mol % or more. Meanwhile, the upper limit of the degree of saponification is more preferably, but not particularly limited to, 95 mol % or less, even more preferably 93 mol % or less, and particularly preferably 90 mol % or less.

In this context, the degree of saponification of the PVA means a ratio (mol %) indicating the number of moles of the vinyl alcohol units based on the total number of moles of the structural units (typically, vinyl ester monomer units) that may be converted to vinyl alcohol units by saponification and the vinyl alcohol units.

The degree of saponification of the PVA may be measured in accordance with the description of JIS K 6726-1994.

The PVA film may contain one kind of PVA singly or may contain two or more kinds of PVA having a degree of polymerization, a degree of saponification, a degree of modification, and the like different from each other.

The upper limit of the PVA content in the PVA film is preferably, but not particularly limited to, 100 mass % or less. Meanwhile, the lower limit of the PVA content is preferably, but not particularly limited to, 50 mass % or more, more preferably 80 mass % or more, and even more preferably 85 mass % or more.

Moisture

The PVA film of the present invention has a moisture content from 1 to 5 mass %, preferably from 1.5 to 4.5 mass %, and more preferably from 2 to 4 mass %. A moisture content of the PVA film of more than 5 mass % tends to cause a shift in printing patterns during high speed printing and nonuniform extension of the PVA film during printing. Meanwhile, a moisture content of less than 1 mass % is likely to cause rupture of the PVA film during unwinding of the PVA film wound in a roll. It is also likely to produce static electricity on the PVA film and thus sometimes causes attachment of dusts and trash, not allowing high resolution printing.

It should be noted that the moisture content of the PVA film is calculated from a change in the weight of the PVA film before and after drying the PVA film under the conditions of 50° C.×2 hours with a vacuum drier.

Plasticizer

The PVA film does not have to be limited, but may contain a plasticizer. The content of the plasticizer is preferably from 0.5 to 15 parts by mass based on 100 parts by mass of the PVA. The content of the plasticizer of more than 15 parts by mass is likely to cause nonuniform drawing during high speed printing depending on the temperature, humidity, and the like of the atmosphere during printing. Meanwhile, although the content of the plasticizer may be 0.5 parts by mass, a small content of the plasticizer tends to facilitate rupture of the PVA film during unwinding. From these perspectives, the content of the plasticizer is more preferably from 0.5 to 8 parts by mass based on 100 parts by mass of the PVA, even more preferably from 1 to 6 parts by mass, and particularly preferably from 1.5 to 5 parts by mass.

By changing the content of the plasticizer, it is possible to adjust the abundance ratios of the respective moving components (crystalline component, constrained amorphous component, and amorphous component) in PVA.

Although differing depending on the primary structure of the molecular chain of the PVA, a PVA film containing a small amount of the plasticizer generally facilitates proceedings of crystallization by heat treatment compared with a PVA film not containing the plasticizer. This is assumed to be because the molecules of the PVA are facilitated to move and thus facilitated to form a crystal or constrained amorphous structure, which is energetically more stable.

In contrast, a PVA film containing an excessive amount of the plasticizer exhibits a tendency to inhibit proceedings of crystallization. This tendency is assumed to be because the amount of the plasticizer interacting with the hydroxyl groups in the molecules of PVA is large to cause reduction in the interaction between the molecules of PVA.

For these reasons, in order to regulate the amount (A1) of crystalline component and the amount (A2) of constrained amorphous component and the ratio of the amount (A1) of crystalline component and the amount (A2) of constrained amorphous component in the PVA film within appropriate ranges, the content of the plasticizer is preferably from 0.5 to 15 parts by mass based on 100 parts by mass of the PVA.

Examples of the plasticizer include polyhydric alcohols, such as ethylene glycol, glycerin, diglycerin, propylene glycol, diethylene glycol, triethylene glycol, tetraethylene glycol, trimethylolpropane, and sorbitol, and the like. One kind of these plasticizers may be singly used or two or more kinds of them may be used together. Among those mentioned above, for the reasons of not readily bleeding out on a surface of the PVA film and the like, the plasticizer is preferably, but not particularly limited to, ethylene glycol or glycerin and more preferably glycerin.

Starch/Water-Soluble Polymer

The PVA film preferably contains at least one of starch and a water-soluble polymer other than PVA. The at least one of starch and a water-soluble polymer other than PVA thus contained allows adjustment of mechanical strength expected for forming a printing layer on the PVA film (base film), moisture resistance during handling of the PVA film having a printing layer formed thereon, flexibilization of the PVA film due to water absorption while being floated on a water surface, spreadability and diffusibility on a water surface, or the like.

Examples of the starch include: natural starches, such as corn starch, potato starch, sweet potato starch, wheat starch, rice starch, tapioca starch, and sago starch; processed starches subjected to etherification, esterification, oxidation, and the like; and the like, and processed starches are particularly preferred. Addition of the starch gives an effect of, in addition to the above effects, inhibiting close contact between the PVA films or between the PVA film and the metal roll. The close contact between the PVA films is not preferred because it causes extension of the PVA films when the PVA film (base film) is subjected to continuous printing and the like.

The content of the starch in the PVA film is preferably, but not particularly limited to, from 0.1 to 15 parts by mass based on 100 parts by mass of the PVA and more preferably from 0.3 to 10 parts by mass, and even more preferably from 0.5 to 5 parts by mass.

Examples of the water-soluble polymer other than PVA include dextrin, gelatin, glue, casein, shellac, gum arabic, polyacrylic acid amide, sodium polyacrylate, polyvinyl methyl ether, copolymers of methyl vinyl ether and maleic anhydride, copolymers of vinyl acetate and itaconic acid, polyvinylpyrrolidone, cellulose, acetylcellulose, acetylbutylcellulose, carboxymethylcellulose, methylcellulose, ethylcellulose, hydroxyethylcellulose, sodium alginate, and the like.

The content of the water-soluble polymer other than PVA in the PVA film is preferably, but not particularly limited to, 15 parts by mass or less based on 100 parts by mass of the PVA and more preferably 10 parts by mass or less. The content of the water-soluble polymer other than PVA in the above range allows a sufficient increase in the water solubility of the PVA film.

Surfactant

The PVA film preferably contains, but not particularly limited to, a surfactant. The surfactant thus contained allows improvement of the handleability of the PVA film and the releasability of the PVA film from the film formation apparatus during production.

The surfactant is not particularly limited and, for example, anionic surfactants, nonionic surfactants, and the like may be used.

Examples of such an anionic surfactant include: carboxylic acid-based surfactants, such as potassium laurate; sulfuric ester-based surfactants, such as octyl sulfate; sulfonic acid-based surfactants, such as dodecylbenzenesulfonate; and the like.

Examples of such a nonionic surfactant include: alkyl ether-based surfactants, such as polyoxyethylene lauryl ether and polyoxyethylene oleyl ether; alkylphenyl ether-based surfactants, such as polyoxyethylene octylphenyl ether; alkyl ester-based surfactants, such as polyoxyethylene laurate; alkylamine-based surfactants, such as polyoxyethylene laurylamino ether; alkylamide-based surfactants, such as polyoxyethylene lauric acid amide; polypropylene glycol ether-based surfactants, such as polyoxyethylene polyoxypropylene ether; alkanolamide-based surfactants, such as lauric acid diethanolamide and oleic acid diethanolamide; allyl phenyl ether-based surfactants, such as polyoxyalkylene allyl phenyl ether; and the like.

One kind of these surfactants may be singly used or two or more kinds of them may be used together. Among the surfactants mentioned above, due to an excellent effect of reducing surface irregularities during formation of such a PVA film and the like, the surfactant is preferably, but not particularly limited to, nonionic surfactants, more preferably alkanolamide-based surfactants, and even more preferably dialkanolamide (e.g., diethanolamide, etc.) of aliphatic carboxylic acid (e.g., saturated or unsaturated aliphatic carboxylic acid having a carbon number from 8 to 30, etc.).

The lower limit of the content of the surfactant in the PVA film is preferably, but not particularly limited to, 0.01 part by mass or more based on 100 parts by mass of the PVA, more preferably 0.02 parts by mass or more, and even more preferably 0.05 parts by mass or more. Meanwhile, the upper limit of the content of the surfactant is preferably, but not particularly limited to, 10 parts by mass or less based on 100 parts by mass of the PVA, more preferably 1 part by mass or less, even more preferably 0.5 parts by mass or less, and particularly preferably 0.3 parts by mass or less. The content of the surfactant in the above range allows better releasability of the PVA film from the film formation apparatus during production and causes less problems, such as blocking of the PVA films with each other. The problems of bleeding out of the surfactant on a surface of the PVA film, deterioration of the appearance of the PVA film due to aggregation of the surfactant, and the like are also less likely to occur.

Inorganic Salts

To the PVA film of the present invention, inorganic salts may be added without impairing the effects of the present invention in order to regulate the rate of flexibilization due to the water absorption after being floated on a water surface, the spreadability in water, and the time taken for diffusion in water.

Examples of the inorganic salts include, but not particularly limited to, boric acid, borax, and the like. The amount to be added is preferably 5 parts by mass or less based on 100 parts by mass of the PVA and more preferably 1 part by mass or less. An amount of the inorganic salts of more than 5 parts by mass is not preferred because it causes severe reduction in the water solubility of the PVA film.

Other Components

In addition to the plasticizer, the starch, the water-soluble polymer other than PVA, the surfactant, inorganic salts, and moisture, without impairing the effects of the present invention, the PVA film may contain components, such as antioxidants, ultraviolet absorbers, lubricants, cross-linking agents, colorants, fillers, antiseptics, mildewcides, and other polymer compounds.

The ratio of the summed mass of the PVA, the plasticizer, the starch, the water-soluble polymer other than PVA, and the surfactant to the total mass of the PVA film is preferably, but not particularly limited to, from 60 to 100 mass %, more preferably from 80 to 100 mass %, and even more preferably from 90 to 100 mass %.

Base Film

Water-Soluble Film

Complete dissolution time of the base film (PVA film) using PVA as a raw material of the present invention immersed in deionized water at 10° C. is preferably 90 seconds or less and more preferably from 5 to 90 seconds. The upper limit of the complete dissolution time is more preferably 80 seconds or less, even more preferably 70 seconds or less, particularly preferably 65 seconds or less. The PVA film having complete dissolution time of more than 90 seconds has a risk of causing difficulty in washing and removing the residual PVA on the surface of the article subjected to transfer printing, depending on the material and conditions of the surface of the article, after transfer printing of the printing layer on the surface of the article. Meanwhile, the lower limit of the complete dissolution time is more preferably 10 seconds or more, even more preferably 15 seconds or more, and particularly preferably 20 seconds or more. The PVA film having complete dissolution time of less than 5 seconds has a risk of causing problems, such as blocking of the PVA films with each other and reduction in the mechanical strength due to absorption of moisture in the atmosphere depending on the temperature, humidity, and the like of the atmosphere for storage of the PVA film.

The complete dissolution time when the PVA film is immersed in deionized water at 10° C. is measured as follows.

<1> The PVA film is left in a thermohygrostat conditioned at 20° C.-65% RH for 16 hours or more for humidity control.

<2> A rectangular sample with a length of 40 mm×a width of 35 mm is cut from the humidity controlled PVA film and then sandwiched for fixation between two 50 mm×50 mm plastic plates having a rectangular window (hole) with a length of 35 mm×a width 23 mm in a position where the longitudinal direction of the sample is parallel to the longitudinal direction of the window and the window is approximately at the center in the sample width direction.

<3> In a 500 mL beaker, 300 mL of deionized water is put and the water temperature is adjusted at 10° C. while stirring with a magnetic stirrer having a bar with a length of 3 cm at the number of revolutions of 280 rpm.

<4> The sample fixed to the plastic plates in <2> above is immersed in the deionized water in the beaker with attention not to contact the bar of the magnetic stirrer.

<5> The time from the immersion in the deionized water to complete disappearance of the sample pieces dispersed in the deionized water is measured.

The thickness of the PVA film is preferably, but not particularly limited to, in a range below. That is, the upper limit of the thickness is preferably 50 μm or less, more preferably 48 μm or less, even more preferably 45 μm or less. Meanwhile, the lower limit of the thickness is preferably, but not particularly limited to, 15 μm or more, more preferably 20 μm or more, even more preferably 22 μm or more, and particularly preferably 25 μm or more. A thickness of the PVA film of more than 50 μm sometimes causes reduction in productivity and is not preferred because it takes time to swell the PVA film floated on a water surface and to remove the PVA film after transfer printing from the shaped object. A thickness of the PVA film of less than 15 μm causes reduction in the strength of the PVA film and is not preferred because the film sometimes tears during printing and the like or the film sometimes tears by pressing a shaped object (article subjected to transfer printing) from above during hydraulic transfer printing, thereby not allowing transfer printing.

It should be noted that the thickness of the PVA film may be obtained as an average value of thicknesses measured at ten arbitrary spots (e.g., ten arbitrary spots on a straight line in the longitudinal direction of the PVA film).

Method of Producing PVA Film

A method of producing the PVA film of the present invention is not particularly limited and it is possible to use, for example, an arbitrary method as below.

Examples of the method of producing the PVA film include: a film formation method where a solvent, additives, and the like are added to PVA and homogenized to obtain a film forming stock solution to be subjected to casting film formation, wet film formation (discharge into a poor solvent), dry/wet film formation, gel film formation (a method where the film forming stock solution is temporarily cooled to form a gel and then the solvent is extracted and removed), and in combination of the methods described above, melt extrusion film formation where the film forming stock solution thus obtained is extruded from a T die or the like using an extruder or the like, inflation molding, and the like. Among the methods mentioned above, the method of producing the PVA film is preferably casting film formation or melt extrusion film formation. Use of casting film formation or melt extrusion film formation allows a homogeneous PVA film to be productively obtained.

A description is given below to a case of producing the PVA film using casting film formation or melt extrusion film formation.

In a case of producing the PVA film using casting film formation or melt extrusion film formation, a film forming stock solution is prepared at first that contains PVA, a solvent, additives, such as the plasticizer and the starch, as needed. It should be noted that, in the case of the film forming stock solution containing the additives, the ratio of the additives to PVA in the film forming stock solution is substantially equal to the above-described ratio of the additives to PVA in the PVA film.

The film forming stock solution is then casted (fed) in the form of film on a rotating support, such as a metal roll and a metal belt. A liquid coating of the film forming stock solution is thus formed on the support. The liquid coating is heated on the support to remove the solvent and thus solidified to be formed into a film.

The solidified long film (PVA film) is released from the support, dried as needed by a drying roll, a drying furnace, and the like, and further heat treated as needed to be wound in rolls.

In the drying process of the liquid coating casted on the support (solvent removal process) and the following drying process of the PVA film, crystallization proceeds while the PVA is heated. Particularly, heating in a region with a high moisture content increases the mobility of the molecular chain of the PVA and thus crystallization proceeds, causing the amount (A2) of constrained amorphous component to be likely to decrease and the amount (A1) of crystalline component to be likely to increase. It is thus possible to control the degree of crystallization of the PVA by the drying rate in the drying process. For example, a faster drying rate inhibits crystal growth and exhibits a tendency to reduce the amount (A1) of crystalline component. In contrast, a slower drying rate accelerates crystal growth and exhibits a tendency to increase (A1/A2). A greater amount of heat to be provided causes an increase in the amount (A1) of crystalline component and exhibits a tendency to reduce the water solubility of the PVA.

It should be noted that the drying rate may be adjusted by the temperature of the support, the contact time with the support, the temperature and the amount of hot air, the temperatures of the drying roll and the drying furnace, and the like.

The ratio of volatile components (concentration of the volatile components, such as the solvent removed by volatilization and evaporation during film formation and the like) in the film forming stock solution is preferably, but not particularly limited to, from 50 to 90 mass % and more preferably from 55 to 80 mass %. The ratio of volatile components in the above range allows adjustment of the viscosity of the film forming stock solution in a preferred range, thereby improving film formability of the PVA film (liquid coating) and facilitating production of the PVA film with a uniform thickness. The ratio of volatile components in the film forming stock solution is appropriate and thus the crystallization of the PVA on the support moderately proceeds to facilitate balancing the amount (A2) of constrained amorphous component and the amount (A1) of crystalline component.

In this context, the "ratio of volatile components in the film forming stock solution" herein means a value obtained by the following formula.

Ratio of Volatile Components in Film Forming Stock Solution (mass %)={($Wa-Wb$)/$Wa$}×100 (Math 5)

In the formula, Wa denotes the mass (g) of the film forming stock solution and Wb denotes the mass (g) of the film forming stock solution after Wa (g) of the solution is dried in an electric heat drier at 105° C. for 16 hours.

Examples of the method of adjusting the film forming stock solution include, but not particularly limited to, a method where PVA and the additives, such as a plasticizer and a surfactant, are dissolved in a dissolution tank or the like, a method where PVA in a hydrated state is melt kneaded together with the additives, such as a plasticizer and a surfactant, using a single- or twin-screw extruder, and the like.

The surface temperature of the support for casting of the film forming stock solution is preferably, but not particularly limited to, from 50° C. to 110° C., more preferably from 60° C. to 100° C., and even more preferably from 65° C. to 95° C. The surface temperature in the above range causes drying of the liquid coating to proceed at a moderate rate and thus prevents an excessive increase in the amount (A1) of crystalline component, and also causes the drying of the liquid coating to take not too long time and thus the productivity of the PVA film is not reduced. The drying of the liquid coating proceeding at a moderate rate is less likely to cause irregularities, such as foaming, generated on a surface of the PVA film and thus preferably prevents an excessive increase in the amount (A3) of amorphous component and a relatively excessive reduction in the amount (A2) of constrained amorphous component.

Simultaneously with heating of the liquid coating on the support, hot air at a wind velocity from 1 to 10 m/second may be uniformly blown on the entire region on a non-contact surface side of the liquid coating. This allows regulation of the drying rate of the liquid coating. The temperature of the hot air blown on the non-contact surface side is preferably, but not particularly limited to, from 50° C. to 150° C. and more preferably from 70° C. to 120° C.

The temperature of the hot air in the above range allows a greater increase in the drying efficiency of the liquid coating, uniformity of drying, and the like.

When the feeding rate (discharge rate) of the film forming stock solution on the support is S0 [m/second] and the rotation speed (peripheral speed) of the support is S1 [m/second], a ratio (S1/S0) of the rotation speed (peripheral speed) S1 of the support to the feeding rate (discharge rate) S0 of the film forming stock solution on the support is preferably in a range below. That is, the upper limit of (S1/S0) is preferably, but not particularly limited to, 7 or less, more preferably 6.8 or less, and even more preferably 6.5 or less. Meanwhile, the lower limit of (S1/S0) is preferably, but not particularly limited to, more than 3, more preferably more than 5, even more preferably more than 5.2, and particularly preferably more than 5.5. (S1/S0) in the above range causes the crystallization due to the orientation of the molecular chain of the PVA in the liquid coating to moderately proceed and the amount (A1) of crystalline component to be appropriate. It is also possible to inhibit deformation of the liquid coating due to the gravity between the die lips and the support, and thus problems, such as uneven thickness, are less likely to occur in the PVA film.

It should be noted that the feeding rate (S0) of the film forming stock solution means a linear velocity in the flow direction of the film forming stock solution. Specifically, it is possible to obtain the feeding rate (S0) of the film forming stock solution by dividing the volume of the film forming stock solution fed (discharged) from a film-form discharge apparatus per unit time by an opening area (the product of the slit width and an average value of the degrees of slit opening of the film-form discharge apparatus) of the slit of the film-form discharge apparatus.

The PVA film is preferably dried (solvent removal) to a ratio of volatile components from 5 to 50 mass % on the support and then released from the support and further dried as needed.

Examples of the drying method include, but not particularly limited to, a method including passing through a drying furnace and a method including contacting a drying roll.

In the case of drying the PVA film using a plurality of drying rolls, it is preferred that one surface and the other surface of the PVA film alternately contact the drying rolls. This allows homogenization of the degree of crystallization of PVA on both surfaces of the PVA film. In this case, a greater number of drying rolls facilitates adjustment of the amount (A1) of crystalline component, the amount (A2) of constrained amorphous component, and the amount (A3) of amorphous component while adjusting the moisture content in the PVA film from 1 to 5 mass %. However, an excessively large number of drying rolls causes an increase in the costs of equipment and operation. Thus, the number of drying rolls is preferably, but not particularly limited to, three or more, more preferably four or more, and even more preferably from 5 to 30.

The temperature of the drying furnace or the drying roll(s) is preferably, but not particularly limited to, from 40° C. to 110° C. The upper limit of the temperature of the drying furnace or the drying roll(s) is more preferably 100° C. or less, even more preferably 90° C. or less, and particularly preferably 85° C. or less. Meanwhile, the lower limit of the temperature of the drying furnace or the drying roll(s) is more preferably, but not particularly limited to, 45° C. or more and even more preferably 50° C. or more. The temperature of the drying furnace or the drying roll(s) in the above range facilitates balancing the amount (A1) of crystalline component and the amount (A3) of amorphous component.

The PVA film after drying may further be heat treated as needed. The heat treatment allows adjustment of the properties, such as mechanical strength and water solubility, of the PVA film.

The temperature of the heat treatment is preferably, but not particularly limited to, from 60° C. to 135° C. The upper limit of the heat treatment temperature is more preferably 130° C. or less. The temperature of the heat treatment in the above range allows the amount of heat provided to the PVA film not to be excessive and the amount (A1) of crystalline component to be appropriately adjusted.

The PVA film may further be subjected to embossing as needed. In embossing as well, heating of the PVA film allows adjustment of the properties, such as mechanical strength and water solubility, of the PVA film.

The temperature for embossing is preferably, but not particularly limited to, from 60° C. to 135° C. The upper limit of the embossing temperature is more preferably 130° C. or less. The embossing temperature in the above range allows the amount of heat provided to the PVA film not to be excessive and the amount (A1) of crystalline component to be adjusted in an appropriate amount.

The PVA film thus produced is subjected to further humidity control, cutting of both edges (trimmings) of the film, and the like as needed, and then wound in rolls on a cylindrical core and moistureproof packaged to be a product. The PVA film of the present invention does not have to be limited to, but is usually used as a printing film for hydraulic transfer printing by continuously printing on the surface. The PVA film of the present invention is thus preferably wound with a length approximately from 1 to 3000 m and the film with a width approximately from 0.5 to 4 m is preferably used.

Printing Film for Hydraulic Transfer Printing

The PVA film of the present invention may be provided with a printing layer by continuous printing using printing ink usually used by those skilled in the art, by employing a printing technique, such as gravure printing, screen printing, offset printing, and roll coating.

The printing film for hydraulic transfer printing of the present invention thus has the PVA film of the present invention (base film) and a printing layer formed on a surface of the PVA film.

Such a printing film for hydraulic transfer printing is used for printing on: wooden base materials, such as a wood board, a plywood, and a particle board; various plastic shaped articles; fiber cement products, such as a pulp cement board, a slate board, an asbestos cement board, a GRC (glass fiber reinforced cement) shaped article, and a concrete slab; inorganic plat-like structures, such as a gypsum board, a calcium silicate board, and a magnesium silicate plate; metal plates made of iron, copper, aluminum, or the like and alloy plates thereof; complexes thereof; and the like.

The shape of the surface of the shaped object subjected to printing (article subjected to transfer printing) may be flat, rough, or uneven, and the printing film for hydraulic transfer printing is preferably used for printing on a surface of a shaped object and the like with uneven shapes.

A method of printing on a surface of a shaped object using the printing film for hydraulic transfer printing of the present invention includes, for example: firstly floating a printing film for hydraulic transfer printing on a water surface with a printing layer upward; second activating the printing layer with a solvent and the like; thirdly lowering a shaped object with a transfer printing surface of its surfaces downward from above the printing film for hydraulic transfer printing floated on the water surface; fourthly removing a PVA film after the printing layer for the sheet for hydraulic transfer printing sufficiently adheres to the transfer printing surface of the shaped object; and fifthly sufficiently drying the shaped object with the printing layer thus transferred to obtain an intended product.

It should be noted that the printing layer may be a monolayer printing layer and is preferably a laminated printing layer having laminated printing patterns different in at least one of hue, saturation, and brightness. The present invention prevents a shift between the printing layers in the laminated printing layer and allows high resolution transfer printing on the shaped object.

EXAMPLES

Although the present invention is specifically described below by way of Examples and the like, the present invention is not at all limited by Examples below. It should be noted that, in Examples and Comparative Examples below, evaluation items and evaluation methods were used as follows.

(1) Quantification of Amount (A1) of Crystalline Component, Amount (A2) of Constrained Amorphous Component, and Amount (A3) of Amorphous Component By $^1$H Pulse NMR At first, 25 mg of a PVA film was cut in size of approximately 5 mm×5 mm to obtain a sample, and then the sample was contained in an NMR tube with an inner diameter of 10 mm.

Then, into the NMR tube containing the sample, 1 mL of deuterated methanol was fed and left at room temperature for 24 hours.

Then, $^1$H pulse NMR measurement of the sample was performed under conditions below using the pulse NMR measurement apparatus to obtain a spin-spin relaxation curve.

Measurement Apparatus: NMR Analyzer mq20 the minispec (manufactured by BRUKER)
Pulse Sequence: Solid-Echo
Pulse Width: 7.22 µs
Pulse Repetition Interval: 1 s
Dummy Shoot: 0
Pulsed Atten: 0 dB
Number of Accumulation: 32 times
Measurement Temperature: 40° C.
Gain: from 70 to 110 dB (regulated in accordance with observation intensity of sample)

By fitting the spin-spin relaxation curve thus obtained using the method described above, the amount (A1) of crystalline component, the amount (A2) of constrained amorphous component, and the amount (A3) of amorphous component in the sample were quantitated.

(2) Complete Dissolution Time of PVA Film

The complete dissolution time of the PVA film in deionized water at 10° C. was obtained by the method described above.

(3) Moisture Content

A change rate of weight after drying at 50° C. for two hours under reduced pressures of 1 Pa or less using a vacuum drier (DP33 manufactured by Yamato Scientific Co., Ltd.) and a vacuum pump (VR16LP manufactured by Hitachi Koki Co., Ltd.) was defined as the moisture content of the PVA film.

Moisture Content=(Weight of PVA Film before Drying−Weight of PVA Film after Drying)/Weight of PVA Film before Drying (4) Rupture Counts, High Speed Printability Using three colors of ink for building materials containing 70 weight % of a mixture of dye and barium sulfate and 30 weight % of a mixture of an alkyd resin and nitrocellulose, woodgrain was gravure printed on a surface of a 1000 m PVA film as the base film in the atmosphere at 20° C. and 72% RH. A printing film for hydraulic transfer printing was thus obtained. The thickness of each printing layer was 2 μm, the unwinding tension was 1 kg/m, and the printing speed was 50 m/minute. The ruptures occurred during the printing were counted. The printing film for hydraulic transfer printing after printing was dried in a 1 m drying zone heated with hot air at 60° C. The printing surface after drying was observed to evaluate the high speed printability by the following criteria.

A: It was difficult to recognize printing shift by observing with a magnifying glass.
B: While it was difficult to recognize printing shift by visual inspection, it was possible by observing with a magnifying glass.
C: It was possible to recognize printing shift by visual inspection.

Example 1

A film forming stock solution was prepared at first by adding 100 parts by mass of PVA (degree of saponification of 88 mol %, viscosity-average degree of polymerization of 1700) obtained by saponifying polyvinyl acetate, 5 parts by mass of etherified starch, 5 parts by mass of glycerin as the plasticizer, 0.5 parts by mass of lauric acid diethanolamide as the surfactant, and water. It should be noted that the ratio of volatile components in the film forming stock solution was 70 mass %.

The film forming stock solution was then discharged in the form of film on a metal roll (first roll, surface temperature of 90° C.) as the support from a T die to form a liquid coating on the metal roll. On the metal roll, hot air at 90° C. was blown for drying at a rate of 5 m/second on the entire surface of the liquid coating not in contact with the metal roll. A PVA film was thus obtained.

The PVA film was then released from the metal roll and dried by alternately contacting one surface and the other surface of the PVA film with drying rolls and then was wound on a cylindrical core in rolls. It should be noted that the surface temperature of each drying roll was set at 75° C. The PVA film thus obtained was embossed under the conditions of an emboss roll temperature of 100° C. and a linear pressure of 30 kg/cm to obtain a PVA film with a thickness of 35 μm in a roll. The PVA film thus obtained was a film with a moisture content of 2.1%, a width of 1.2 m, and a length of 1000 m. The roll of the wound PVA film was immediately moistureproof packaged using an aluminum laminated film.

The PVA film thus obtained was subjected to $^1$H pulse NMR measurement and the amount (A1) of crystalline component was 28%, the amount (A2) of constrained amorphous component was 39%, the amount (A3) of amorphous component was 33%, (A1/A2) was 0.73, and (A2/A3) was 1.19.

The complete dissolution time of the PVA film thus obtained was measured, and the complete dissolution time was 62 seconds.

A package prepared by the PVA film thus obtained was subjected to the high speed printability evaluation and was evaluated as A. The rupture counts during the printing was 0.

Example 2 and Comparative Examples 1 and 2

PVA films were obtained in the same manner as in Example 1 except for changing the surface temperature of the metal roll as the support on which the film forming stock solution was discharged from the T die and the temperature of the hot air blown on the entire surface of the liquid coating not in contact with the metal roll over the metal roll respectively to 105° C., 120° C., and 60° C. and changing the temperature of the drying rolls respectively to 70° C., 67° C., and 80° C.

Example 3 and Comparative Example 3

PVA films were obtained in the same manner as in Example 1 except for changing the temperature of the emboss roll in the embossing respectively to 120° C. and 140° C.

Comparative Example 4

A PVA film was obtained in the same manner as in Example 1 except for changing the surface temperature of the metal roll as the support on which the film forming stock solution was discharged from the T die and the temperature of the hot air blown on the entire surface of the liquid coating not in contact with the metal roll over the metal roll to 110° C. and changing the temperature of the emboss roll in the embossing to 90° C.

Examples 4 and 5

PVA films were obtained in the same manner as in Example 1 except for changing the amount of glycerin as the plasticizer respectively to 15 parts by mass and 0 parts by mass based on 100 parts by mass of the PVA.

Example 6

A PVA film was obtained in the same manner as in Example 1 except for changing the PVA used for preparation of the film forming stock solution to maleic acid monomethyl ester (MMM) modified PVA (degree of saponification of 88 mol %, degree of polymerization of 1700, and amount of MMM modification of 5 mol %).

Examples 7 and 8

PVA films were obtained in the same manner as in Example 1 except for changing the surface temperature of the respective drying rolls respectively to 80° C. and 67° C.

Comparative Examples 5 and 6

PVA films were obtained in the same manner as in Example 1 except for removing the moistureproof package from the roll of the PVA film obtained in the same manner as in Example 1 and adjusting the moisture content of the PVA film by storage respectively in a vacuum drier at 50° C. and a chamber conditioned at 23° C.-50% RH for seven days.

The evaluation results of the respective PVA films thus obtained are shown in Tables 1 and 2.

ability evaluation, and the evaluation was A (it was difficult to recognize printing shift by observing with a magnifying glass).

As shown in Tables 1 and 2, it was confirmed that the amount (A1) of crystalline component, the amount (A2) of constrained amorphous component, and the amount (A3) of amorphous component in the PVA film were allowed to be

TABLE 1

| | | Example 1 | Example 2 | Example 3 | Example 4 | Example 5 | Example 6 | Example 7 | Example 8 |
|---|---|---|---|---|---|---|---|---|---|
| Degree of Polymerization | | 1700 | 1700 | 1700 | 1700 | 1700 | 1700 | 1700 | 1700 |
| Degree of Saponification (mol %) | | 88 | 88 | 88 | 88 | 88 | 88 | 88 | 88 |
| Modification | | None | None | None | None | None | MMM 5 mol % | None | None |
| Plasticizer | Glycerin (parts by mass) | 5 | 5 | 5 | 15 | 0 | 5 | 5 | 5 |
| Film Formation Conditions (° C.) | First Roll Temperature (° C.) | 90 | 105 | 90 | 90 | 90 | 90 | 90 | 90 |
| | Hot Air Temperature (° C.) | 90 | 105 | 90 | 90 | 90 | 90 | 90 | 90 |
| | Drying Roll Temperature (° C.) | 75 | 70 | 75 | 75 | 75 | 75 | 80 | 67 |
| | Embossing Temperature (° C.) | 100 | 100 | 120 | 100 | 100 | 100 | 100 | 100 |
| Adjustment of Moisture Content in Film | | None | None | None | None | None | None | None | None |
| Moisture Content in Film (mass %) | | 2.1 | 1.9 | 1.9 | 2.0 | 2.0 | 2.7 | 1.3 | 4.5 |
| Amount (%) of Each Component of Pulse NMR | A1 | 28 | 25 | 59 | 37 | 23 | 24 | 37 | 24 |
| | A2 | 39 | 46 | 11 | 29 | 44 | 40 | 32 | 42 |
| | A3 | 33 | 29 | 30 | 34 | 33 | 36 | 31 | 34 |
| | A1/A2 | 0.73 | 0.54 | 5.36 | 1.28 | 0.52 | 0.60 | 1.16 | 0.57 |
| | A2/A3 | 1.19 | 1.59 | 0.37 | 0.85 | 1.33 | 1.11 | 1.03 | 1.24 |
| Complete Dissolution Time (second) | | 62 | 26 | 87 | 59 | 73 | 35 | 78 | 55 |
| Rupture Count | | 0 | 0 | 0 | 0 | 1 | 0 | 1 | 0 |
| High Speed Printability | | A | B | A | B | A | A | A | B |

TABLE 2

| | | Comparative Example 1 | Comparative Example 2 | Comparative Example 3 | Comparative Example 4 | Comparative Example 5 | Comparative Example 6 | Reference Example 1 |
|---|---|---|---|---|---|---|---|---|
| Degree of Polymerization | | 1700 | 1700 | 1700 | 1700 | 1700 | 1700 | 1700 |
| Degree of Saponification (mol %) | | 88 | 88 | 88 | 88 | 88 | 88 | 88 |
| Modification | | None | None | None | None | None | None | None |
| Plasticizer | Glycerin (parts by mass) | 5 | 5 | 5 | 5 | 5 | 5 | 5 |
| Film Formation Conditions (° C.) | First Roll Temperature (° C.) | 120 | 60 | 90 | 110 | 90 | 90 | 120 |
| | Hot Air Temperature (° C.) | 120 | 60 | 90 | 110 | 90 | 90 | 120 |
| | Drying Roll Temperature (° C.) | 67 | 80 | 75 | 75 | 75 | 75 | 67 |
| | Embossing Temperature (° C.) | 100 | 100 | 140 | 90 | 100 | 100 | 100 |
| Adjustment of Moisture Content in Film | | None | None | None | None | 50° C.-0% RH 7 Days | 23° C.-50% RH 7 Days | None |
| Moisture Content in Film (mass %) | | 1.9 | 2.4 | 1.5 | 2.0 | 0.7 | 5.8 | 1.9 |
| Amount (%) of Each Component of Pulse NMR | A1 | 20 | 62 | 70 | 28 | 34 | 28 | 20 |
| | A2 | 55 | 13 | 8 | 8 | 35 | 34 | 55 |
| | A3 | 25 | 25 | 22 | 64 | 31 | 38 | 25 |
| | A1/A2 | 0.36 | 4.77 | 8.75 | 3.50 | 0.97 | 0.83 | 0.36 |
| | A2/A3 | 2.20 | 0.52 | 0.36 | 0.13 | 1.13 | 0.90 | 2.20 |
| Complete Dissolution Time (second) | | 31 | 92 | 130 | 28 | 77 | 59 | 31 |
| Rupture Count | | 0 | 0 | 2 | 0 | 17 | 0 | 0 |
| High Speed Printability | | C | B | A | C | A | C | A*[1] |

*[1] The high speed printability was evaluated by reducing the printing speed to 25 m/min.

Reference Example 1

Using the PVA film in Comparative Example 1, the printing shift was observed by reducing the printing speed from 50 m/minute to 25 m/minute in the high speed print-ability evaluation, and the evaluation was A (it was difficult to recognize printing shift by observing with a magnifying glass).

adjusted by changing at least one of the kind of PVA, the amount of the plasticizer, the surface temperature of the support (metal roll), the temperature of the drying roll, and the temperature of the emboss roll.

The PVA films in Examples 1 through 8, having the amount (A1) of crystalline component of 60% or less and the amount (A2) of constrained amorphous component from 10% to 50%, had fewer rupture counts during printing and were excellent in water solubility and high speed printability. That is, the PVA films in Examples 1 through 8 were excellent in water solubility, and in the case of being used as a base film, allowed high resolution transfer printing without rupture even under the relatively high speed condition (50 m/min) of the printing speed. In contrast, the PVA films in Comparative Examples 1 through 6 had more rupture counts or were poor in either water solubility or high speed printability.

The invention claimed is:

1. A base film for hydraulic transfer printing comprising a polyvinyl alcohol resin, the base film for a printing layer to be transferred to an article by hydraulic transfer printing, wherein
the base film for hydraulic transfer printing has an amount (A1) of crystalline component of 60% or less and an amount (A2) of constrained amorphous component from 10% to 50%, the amounts being obtained from a spin-spin relaxation curve by 1H pulse NMR measurement of the base film in deuterated methanol, and a moisture content from 1 to 5 mass %, and
complete dissolution time of the base film for hydraulic transfer printing immersed in deionized water at 10° C. is 90 seconds or less.

2. The base film for hydraulic transfer printing according to claim 1, wherein a ratio (A1/A2) of the amount (A1) of crystalline component to the amount (A2) of constrained amorphous component is from 0.1 to 5.

3. The base film for hydraulic transfer printing according to claim 1, wherein a ratio (A2/A3) of the amount (A2) of constrained amorphous component to an amount (A3) of amorphous component obtained from the spin-spin relaxation curve is 1.5 or less.

4. The base film for hydraulic transfer printing according to claim 1, further comprising wherein from 0.5 to 15 parts by mass of a plasticizer and/or from 0.1 to 15 parts by mass of starch blended based on 100 parts by mass of the polyvinyl alcohol resin.

5. The base film for hydraulic transfer printing according to claim 4, comprising from 0.5 to 15 parts by mass of a plasticizer based on 100 parts by mass of the polyvinyl alcohol resin.

6. The base film for hydraulic transfer printing according to claim 5, wherein the plasticizer includes glycerin.

7. The base film for hydraulic transfer printing according to claim 1, wherein the base film for hydraulic transfer printing has a thickness from 15 to 50 μm.

8. A printing film for hydraulic transfer printing, comprising:
the base film for hydraulic transfer printing according to claim 1; and
the printing layer formed on a surface of the base film for hydraulic transfer printing.

9. The printing film for hydraulic transfer printing according to claim 8, wherein the printing layer is a laminated printing layer having laminated printing patterns different in at least one of hue, saturation, and brightness.

10. The base film for hydraulic transfer printing according to claim 1, wherein the amount (A1) of crystalline component is from 20% to 60%.

11. The base film for hydraulic transfer printing according to claim 1, wherein the amount (A1) of crystalline component is from 20% to 50%.

12. The base film for hydraulic transfer printing according to claim 1, wherein the amount (A2) of constrained amorphous component is from 20% to 50%.

13. The base film for hydraulic transfer printing according to claim 1, wherein the base film for hydraulic transfer printing further has an amount (A3) of amorphous component from 10% to 60%.

14. The base film for hydraulic transfer printing according to claim 13, further comprising from 0.1 to 15 parts by mass of starch blended based on 100 parts by mass of the polyvinyl alcohol resin, wherein:
the amount (A1) of crystalline component is from 20% to 60%,
the amount (A2) of constrained amorphous component is from 10% to 50%,
the amount (A3) of amorphous component is from 20% to 50%,
the moisture content is from 1.0 mass % to 4.5 mass %,
a ratio (A2/A3) of the amount (A2) of constrained amorphous component to the amount (A3) of amorphous component obtained from the spin-spin relaxation curve is 1.5 or less,
the polyvinyl alcohol resin has a degree of polymerization from 500 to 3,000, and
the polyvinyl alcohol resin has a degree of saponification from 80 mol % to 90 mol %.

15. The base film for hydraulic transfer printing according to claim 1, wherein the moisture content is from 1.5 to 4.5 mass %.

16. The base film for hydraulic transfer printing according to claim 1, wherein the moisture content is from 2 to 4 mass %.

17. The base film for hydraulic transfer printing according to claim 1, wherein the base film is formed by a process including:
casting a solution including the polyvinyl alcohol resin on a support having a surface temperature from 50° C. to 110° C. to form a film, and
drying the film.

18. The base film for hydraulic transfer printing according to claim 17, wherein the drying of the film includes contacting the film with a drying roll having a surface temperature from 40° C. to 110° C.

19. The base film for hydraulic transfer printing according to claim 1, wherein a ratio (A1/A2) of the amount (A1) of crystalline component to the amount (A2) of constrained amorphous component is from 0.5 to 2.

* * * * *